(12) United States Patent
Adachi et al.

(10) Patent No.: US 10,282,674 B2
(45) Date of Patent: May 7, 2019

(54) HEURISTIC GRAPH EMBEDDING METHODS FOR ADIABATIC QUANTUM COMPUTATION OPTIMIZATION

(71) Applicant: LOCKHEED MARTIN CORPORATION, Bethesda, MD (US)

(72) Inventors: Steven H. Adachi, San Ramon, CA (US); Tessa J. Adair, Garden Grove, CA (US); James C. Boerkoel, Jr., Claremont, CA (US); Taylor W. Brent, San Francisco, CA (US); Douglas S. Campbell, Tucson, AZ (US); Theresa W. Lynn, Claremont, CA (US); Joel R. Ornstein, Boulder, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 764 days.

(21) Appl. No.: 14/831,622

(22) Filed: Aug. 20, 2015

(65) Prior Publication Data

US 2016/0055421 A1    Feb. 25, 2016

Related U.S. Application Data

(60) Provisional application No. 62/039,717, filed on Aug. 20, 2014.

(51) Int. Cl.
*G06N 5/02* (2006.01)
*G06N 99/00* (2019.01)
*G06N 5/00* (2006.01)

(52) U.S. Cl.
CPC .......... *G06N 99/002* (2013.01); *G06N 5/003* (2013.01); *G06N 5/02* (2013.01)

(58) Field of Classification Search
USPC .................................................. 706/46, 45
See application file for complete search history.

(56) References Cited

U.S. PATENT DOCUMENTS

| 7,984,012 B2 | 7/2011 | Coury et al. |
| 8,244,662 B2 | 8/2012 | Coury et al. |

OTHER PUBLICATIONS

Kaufmann, et al., Advanced Techniques for the Creation and Propagation of Modules in Cartesian Genetic Programming, GECCO' 08, Jul. 12-16, 2008, pp. 1-8 (Year: 2008).*

(Continued)

*Primary Examiner* — Wilbert L Starks
(74) *Attorney, Agent, or Firm* — Morgan, Lewis & Bockius LLP

(57) ABSTRACT

Methods are provided for implementing schemes for embedding a particular optimization problem into a particular hardware solution employing unique graph embedding techniques. The disclosed methods implement an adiabatic quantum optimization in a quantum computing device or a quantum processor. Heuristics for graph minor embedding are employed to map a problem graph structure of a particular binary unconstrained optimization problem onto a physical graph structure (topology) of the quantum computing device or quantum processor to provide an optimized hardware implementation. Known constraints that are presented with current schemes in their application to particular hardware solutions are avoided, including limited qubit connectivity and the presence of faulty qubits.

20 Claims, 6 Drawing Sheets

(56) References Cited

OTHER PUBLICATIONS

Richard M. Karp, "Reducibility Among Combinatorial Problems," in Miller, R.E., Thatcher, J.W., Bohlinger, J.D. (eds.) Complexity of Computer Computations, 85 (1972).
Edward Farh I et al., "Quantum Computation by Adiabatic Evolution" (Jan. 28, 2000).
Gabriel Tavares, "New Algorithms for Quadratic Unconstrained Binary Optimization (QUBO) with Applications in Engineering and Social Sciences," PhD Dissertation, Rutgers University, New Brunswick, NJ (May 2008).
Vicky Choi, "Minor-Embedding in Adiabatic Quantum Computation I. The Parameter Setting Problem," Quantum Information Processing 7, 193-209 (Sep. 17, 2008).
Vicky Choi, "Minor-Embedding in Adiabatic Quantum Computation II. Minor-Universal Graph Design," Quantum Information Processing 10(3), 343-353 (Oct. 13, 2010).
Frank Gaitan et al., "Ramsey Numbers and Adiabatic Quantum Computing, " Phys. Rev. Lett. (Jan. 5, 2012).
Christine Klymko et al., "Adiabatic Quantum Programming: Minor Embedding With Hard Faults," Quantum Information Processing 13(3) 709-729 (Nov. 20, 2013).
Andrew Lucas, "Ising Formulations of Many NP Problems," Department of Physics, Harvard University, Cambridge, MA (Jan. 27, 2014).
Frank Gaitan et al., "Graph Isomorphism and Adiabatic Quantum Computing," Phys. Rev. A (Feb. 28, 2014).
Jun Cai et al.. "A Practical Heuristic for Finding Graph Minors" (Jun. 12, 2014).

* cited by examiner

HEURISTIC GRAPH EMBEDDING METHODS FOR ADIABATIC QUANTUM COMPUTATION OPTIMIZATION

This application claims priority to U.S. Provisional Patent Application No. 62/039,717 entitled "Graph Embedding Methods for Adiabatic Quantum Computation," by Steven H. Adachi et al., filed on Aug. 20, 2014, the disclosure of which is hereby incorporated by reference herein in its entirety.

FIELD OF DISCLOSURE

The disclosure relates to the field of adiabatic quantum computation and proposes a plurality of schemes for embedding a particular optimization problem into a particular hardware solution employing unique graph embedding techniques.

BACKGROUND

The term adiabatic quantum computation is generally understood to describe certain methods that employ techniques from quantum physics to solve unconstrained binary optimization problems. The specified optimization problems are generally solved by associating a solution (global minimum) of the optimization problem with a ground state (lowest energy configuration) of a Hamiltonian function.

In practice, the ability of an actual quantum (hardware) device to find such solutions is limited by factors. These factors include, for example, a number of quantum bits or qubits, control precision, and connectivity between qubits. The qubits represent the units of quantum information in the quantum computational structure in much the same way as the standard "bit" does in other computational schemes. A qubit in a general sense represents a two-state quantum-mechanical system, the two states being generally represented as one in the vertical and the other in the horizontal. As such, and unlike a conventional bit, the quantum mechanics allows the qubit to be in a superposition of both states at a same time. It is this property that is fundamental to quantum computing. The logical qubit connectivity required to solve a particular optimization problem can be represented by a graph, which may be referred to as a "problem" graph. The physical qubit connectivity enabled by an actual quantum device can also be represented by a graph, which may be referred to as the "hardware" or "physical" graph. One example of a quantum device that has proven useful for adiabatic quantum computations is the D-WAVE quantum annealing machine, available from D-WAVE Systems, Burnaby, Canada.

There often arise circumstances in which, often due to device limitations, the problem graph cannot be mapped directly onto the hardware graph. Certain techniques exist for overcoming these hardware constraints in solving the optimization problem using a particular quantum device. Such techniques may be referred to as minor embedding techniques. Examples of such minor embedding techniques as examples of known graph embedding techniques are described in U.S. Pat. Nos. 7,984,012 and 8,244,662 to Coury et al.

Other papers describe myriad other known embedding techniques. One such technique is referred to as the TRIAD method. See V. Choi, "Minor-embedding in adiabatic quantum computation: II. Minor-universal graph design," Quantum Information Processing 10(3), 343-353 (October 2010). The TRIAD method is used to embed arbitrary graphs into a hardware graph built up out of unit cells, each of which is a K(n, n) bipartite graph. It has been found that the TRIAD method is useful for showing that a particularly-indicated hardware graph is useful for any problem graph up to a certain size. This method, as described, is somewhat inefficient and constrains the problem graph to a particular limiting size based on the size of the hardware graph. Klymko et al. developed a method for determining all problem graphs that can be embedded into a hardware graph, but the method lacks scalability and tends to be useful only for small hardware graphs. See C. Klymko, B. D. Sullivan, T. S. Humble, "Adiabatic Quantum Programming: Minor Embedding With Hard Faults," Quantum Information Processing 13(3):709-729 (March 2014), Klymko et al. also developed a "greedy" algorithm for problem graphs that are complete graphs.

Each of the conventional solutions includes certain shortfalls and constraints that limit the scope, capacity and or efficiency with which a particular problem graph can be mapped to a particular physical (hardware) graph. Optimal minor embedding for an arbitrary problem graph is itself an NP-hard problem.

SUMMARY

It would be advantageous to determine and provide additional unique methods by which to solve the graph embedding problem and to better implement computationally efficient heuristic schemes that may be capable of operationally executing complex graph embedding into a particular quantum device. Metrics by which to evaluate success for the implementations of such methods may be determined, or otherwise measured, based on a size of the output graph (i.e., an overall number of physical qubits), and/or according to a chain length (i.e. the number of physical qubits needed to implement a logical qubit).

Exemplary embodiments of the disclosed methods may provide schemes, techniques and processes by which to implement what may be referred to as adiabatic quantum optimization.

In embodiments, the disclosed schemes, techniques and processes may provide a plurality of unique approaches for solving discrete optimization problems employing quantum adiabatic evolution principles.

In embodiments, heuristics for graph minor embedding may be employed to map a problem graph structure of a particular complex optimization problem onto a physical graph structure (topology) of a quantum computing device to provide an adiabatic quantum optimization hardware implementation.

Exemplary embodiments may reduce, or otherwise substantially eliminate, known constraints that are presented with current schemes in their application to particular hardware solutions, including limited qubit connectivity and the presence of faulty qubits.

Exemplary embodiments may be directed at two particular experimental solutions with respect to unique embedding techniques. These two experimental solutions may be referred to below as an Iterative Method and an Edge Placement Method.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed methods for implementing embedding an optimization problem (graph) into a hardware (device) solution (graph) employing unique graph embedding techniques, will be described, in detail, with reference to the following drawings, in which.

DESCRIPTION OF THE DISCLOSED EMBODIMENTS

Figure 1:
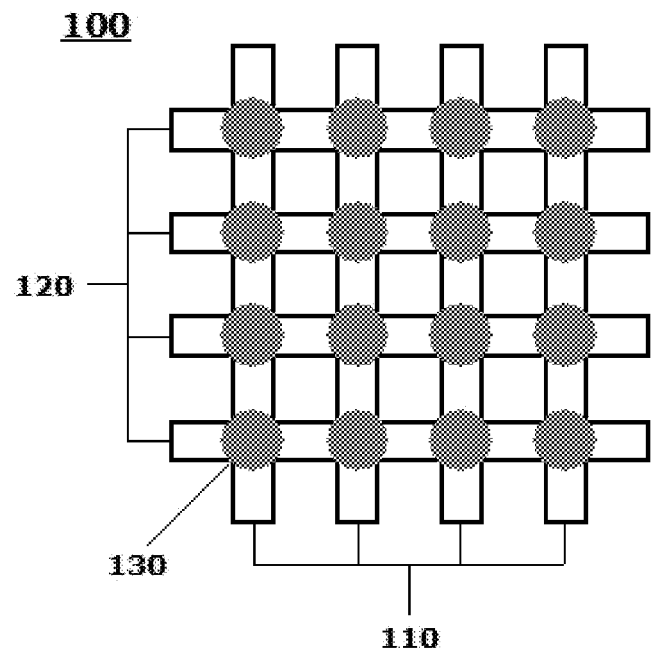
FIG. 1 illustrates a first exemplary schematic representation of an individual unit cell for a quantum computing device in which the graph embedding techniques according to this disclosure may be implemented.

The disclosed methods for implementing embedding an optimization problem (graph) into a hardware (device) solution (graph) employing unique graph embedding techniques, will generally refer to this specific utility for those methods. Exemplary embodiments will be described in this disclosure as being particularly adaptable for use in adiabatic quantum calculations, computations and schemes and may be particularly described as being directed for implementation on a particular quantum computing device. These descriptions and adaptations, as well as the experimental results discussed in broad terms below should not be interpreted as specifically limiting the disclosed schemes to any particular optimization problem or any particular quantum computing device or component that may benefit from carrying into effect the disclosed schemes. In fact, the methods according to this disclosure may advantageously map unconstrained binary optimization problems to advanced quantum computing devices in a manner that overcomes known constraints of previous solutions, and particularly broadens known capacity limitations.

Specific reference to, for example, particular optimization problems or problem sets to which the methods according to this disclosure may be particularly advantageously applied should be understood as being exemplary only, and not limiting the disclosed schemes, in any manner, to any particular class of problems or hardware devices. Testing schemes in which exemplary embodiments of the disclosed schemes were applied included testing of graphs representative of applications in the aerospace industry that were of particular use in presenting representative optimization problems. The disclosed techniques were evaluated according to various metrics, which included a maximum size of a problem graph that could be embedded in a particular hardware device, a number of qubits used, and "chain" length, as those terms will be familiar to those of skill in the art.

While the experimentation yielded noticeable improvements over conventional solutions, no single best embedding technique was determined, among the plurality of disclosed solutions. Rather, the experimental results were dependent on a type of optimization problem and the metrics employed.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

The disclosed embodiments concern graph embedding methods for use by a quantum computer processor configured for quantum computing, or a computer system including a quantum computer processor. Systems of embodiments may include now known or later developed devices, and systems of devices, including quantum computing devices and quantum processors that may be, for example, operable for quantum annealing processes. Generally, computing devices and/or processors and/or such computers include an array of coupled qubits that operate as an artificial Ising spin system with programmable transverse or longitudinal magnetic fields {h} and spin-spin coupling strengths {j}. A quantum computer, which operates according to the quantum adiabatic theorem, provides solutions s in the form of spin states, −1 or +1 of the quantum bits (qubits).

While conventional digital computers require data to be encoded into binary digits (bits), quantum computation uses quantum properties to represent data and perform operations on this data. A quantum computer maintains a sequence of qubits, each qubit representing a 1, 0, or any quantum superposition of the two qubit states. A pair of qubits may be in any quantum superposition of four states. A quantum computer with n qubits can be in an arbitrary superposition of up to $2^n$ different states simultaneously. An adiabatic quantum computer operates by setting the qubits in a controlled initial state and evolving the qubits to a final state that represents solutions to the problem at hand. These concepts are well known and are generally described in, for example a paper by E. Farhi et al. entitled "Quantum computation by adiabatic evolution," (January 2000). The calculation ends with the measurement of all states, collapsing each qubit into one of the two basis states, whereby an outcome is n classical bits of data.

As described, the disclosed schemes for adiabatic quantum optimization present an approach for solving combinatorial optimization problems using the principle of quantum adiabatic evolution. In the optimization schemes, a time-dependent Hamiltonian H(t) of an N-qubit system evolves according to the following Equation 1:

$$H(t) = \left(1 - s\left(\frac{t}{T}\right)\right)H_{init} + s\left(\frac{t}{T}\right)H_{final} \quad \text{Equation 1}$$

where $H_{init}$ is a Hamiltonian with a known ground state, and $H_{final}$ is constructed so that its ground state encodes the desired solution to the combinatorial optimization problem. According to a known adiabatic theorem, for a large enough T and a smooth enough function s determined by the minimum spectral gap, a system starting in the known ground state $H_{init}$ at time t=0 will be in the ground state of $H_{final}$ at time t=T.

Implementations of the adiabatic quantum optimization schemes in quantum computing devices and quantum processors fall short in meeting the ideal conditions assumed by the adiabatic theorem based on a number of factors, including interaction between the physical components of the system and the environment. Theoretical performance guarantees for adiabatic quantum optimization do not necessarily apply, leading to such systems being characterized broadly as "quantum annealing machines."

One known such quantum annealing machine is configured to solve optimization problems formulated, for example, in one of two logically-equivalent forms, according to (1) the Ising Model, or (2) a Quadratic Unconstrained Binary Optimization (QUBO). Those of skill in the art recognize that many well-known NP-hard problems can be expressed in terms of *Ising Models*, or QUBOs. See, e.g., Farhi et al. supra. As other examples, Gaitan et al. applied adiabatic quantum optimization to a problem of finding Ramsey numbers (see "Ramsey numbers and adiabatic quantum computing," Phys. Rev. Lett. (2012)) and a graph isomorphism problem (see "Graph isomorphism and adiabatic quantum computing," Phys. Rev. A. (2014)). Tavares used QUBOs to solve MAX-CUT, MAX-2-SAT, Vertex Cover, and other NP-hard problems. See "New Algorithms for Quadratic Unconstrained Binary Optimization (QUBO) with Applications in Engineering and Social Sciences," PhD Dissertation, Rutgers University, New Brunswick, N.J. (2008). Lucas showed how to formulate all of the Karp NP-hard problems as Ising models. See Lucas, A., "Ising formulations of many NP problems," (2014) and Karp, R. M., "Reducibility among combinatorial problems," in Miller et al. (eds.), *Complexity of Computer Computations*, 85 (1972).

Optimization problems employing such known schemes when applied to physical implementations in quantum computing devices and quantum processors are limited by the number of qubits available in the hardware and the connectivity paths available between the qubits. Previous minor embedding schemes have been directed at partially addressing these shortfalls with limited success as discussed briefly above.

The disclosed methods, schemes, techniques and processes represent advantageous alternative solutions to those outlined above. The disclosed alternatives describe unique schemes for the minor embedding process and expand an envelope for a size of a problem graph that may be embedded in a particular hardware solution in a manner that may be applicable to wider latitude in general hardware graphs. In this regard, the disclosed schemes should not be considered limited in their applicability to only quantum annealing machines as may be described and referenced, but should be considered generally applicable to techniques for graph embedding in myriad applications.

As alluded to above, real-world constraints limit physical implementations of mapping any particular problem directly to quantum hardware. For example, it may be challenging to design a system in which the coupling strength between any pair of qubits could be programmed independently, or to do so in a scalable manner. Adding to the difficulties is that some contingency must be available to address that real-world systems may experience hardware faults that render specific qubits or connections unusable, leading to irregularities in the hardware fabric. The potential for limited qubit connectivity and/or faulty qubits should be accounted for in any advanced graph embedding techniques. Limitations in range and precision with which parameters could be set should be addressed as well.

Figure 2:
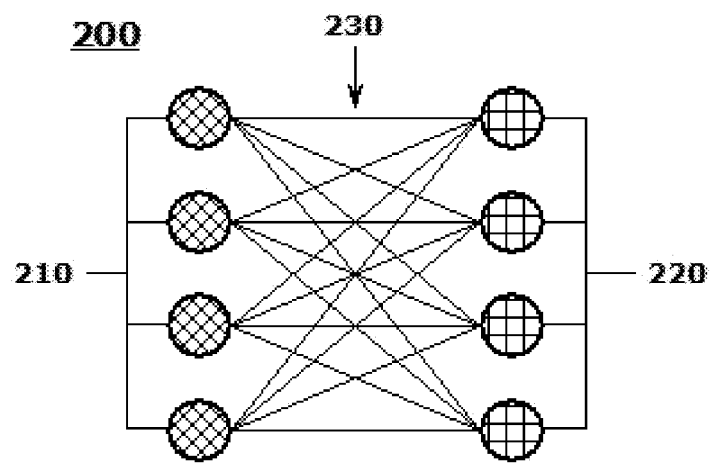
FIG. 2 illustrates a second exemplary schematic representation of an individual unit cell for a quantum computing device in which the graph embedding techniques according to this disclosure may be implemented.

In certain hardware schemes, a physical connectivity between qubits may be determined by a chip layout. In certain conventional physical embodiments, the chip layout may be according to a tiled arrangement of "unit cells" arranged in a manner that may form a rectangular grid. FIG. 1 illustrates a first exemplary schematic presentation of an individual unit cell 100 for a quantum computing device in which the graph embedding techniques according to this disclosure may be implemented. As shown in FIG. 1, the unit cell 100 may consist of eight qubits 110,120, where each qubit may be formed of an elongated loop of superconducting niobium or other comparable material. In FIG. 1, four qubits 110 are oriented vertically, and four qubits 120 are oriented horizontally. At the points 130 where the loops cross, the qubits 110, 120 may interact with each other via, for example, Josephson junctions with a tunable coupling strength. FIG. 2 illustrates a second exemplary schematic presentation of an individual unit cell 200 for a quantum computing device in which the graph embedding techniques according to this disclosure may be implemented. The connectivity between qubits (vertical qubits 210 and horizontal qubits 220) in a single unit cell can be represented as a K(4,4) bipartite graph in the manner shown in FIG. 2 (see the plurality of available connections 230).

Figure 3:
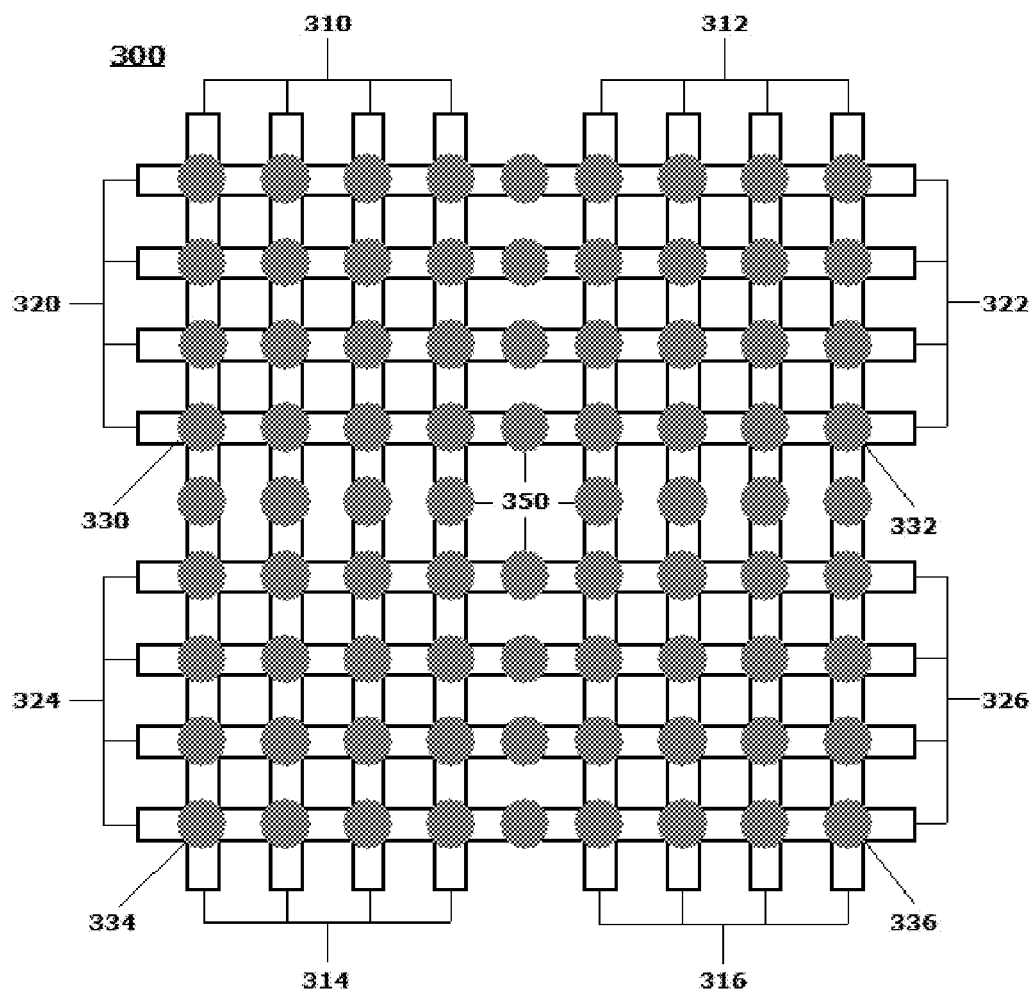
FIG. 3 illustrates a first exemplary schematic representation of an interconnection scheme among four unit cells in a tiled rectangular grid for a quantum computing device in which the graph embedding techniques according to this disclosure may be implemented.

FIG. 3 illustrates a first exemplary schematic presentation of an interconnection scheme 300 among four unit cells in a tiled rectangular grid for a quantum computing device in which the graph embedding techniques according to this disclosure may be implemented. As shown in FIG. 3, the respective vertical qubits 310 and 314, and 312 and 316 in neighboring qubits may be interconnected (see interconnection points 350) and respective horizontal qubits 320 and 322 and 324 and 326 may be interconnected qubits (see interconnection points 350). In the depiction shown in FIG. 3, the interconnections between the unit cells (designated 350) are differentiated from the intra-cell interconnections (330,332,334,336) respectively within the individual unit cells (as shown in FIG. 1). In an expansion of this tiling of unit cells to form as a larger rectangular grid, each "horizontal" qubit is connected to the neighboring qubits on the left and right, and each "vertical" qubit is connected to the neighboring qubits above and below. Thus, each qubit is connected to a total of six other qubits, except for unit cells on a boundary of the chip, where each qubit is connected to only five other qubits. A resulting graph structure (which may be referred to as a Chimera graph) is shown in FIG. 4.

Figure 4:
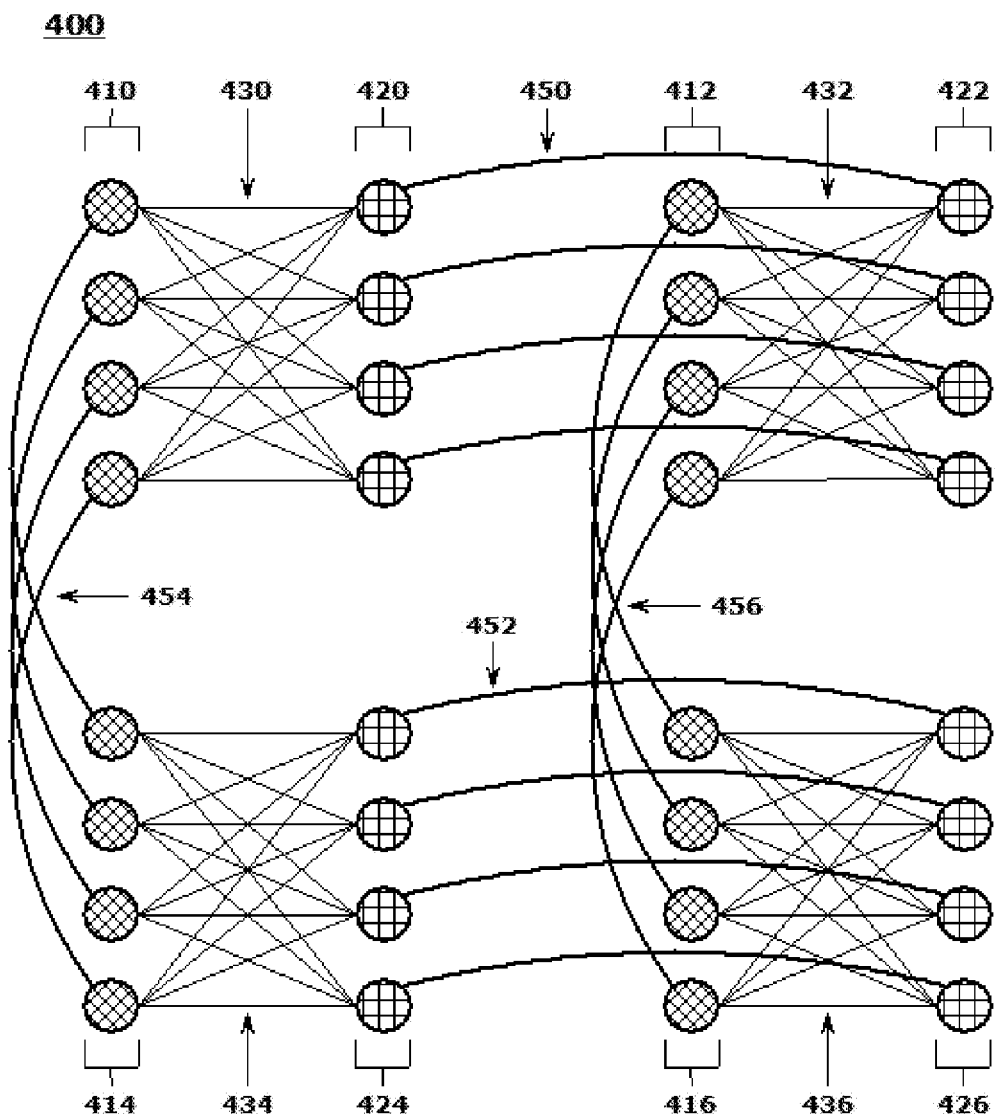
FIG. 4 illustrates a second exemplary schematic presentation of an interconnection scheme among four unit cells for a quantum computing device in which the graph embedding techniques according to this disclosure may be implemented.

FIG. 4 illustrates a second exemplary schematic presentation of an interconnection scheme 400 among four unit cells for a quantum computing device in which the graph embedding techniques according to this disclosure may be implemented. As shown in FIG. 4, the respective vertical qubits 410 and 414, and 412 and 416 in neighboring qubits may be interconnected (see interconnection points 454 and 456) and respective horizontal qubits 420 and 422 and 424 and 426 may be interconnected (see interconnection points 450 and 452). In the depiction shown in FIG. 4, the interconnections 450,452,454,456 between the unit cells are differentiated from the intra-cell interconnections (430,432, 434,436) respectively within the individual unit cells (as shown in FIG. 1).

The multiplicity of connections achievable according to the depicted schemes allow unavailable qubits that are rendered so based on, for example, imperfections in the fabrication and/or calibration of the quantum processor to be bypassed. It is not atypical that a 512-qubit processor may have a significant number of faulty qubits. The processor on which the experimentation to validate the disclosed schemes was hosted included nine faulty qubits. An objective of any scheme for implementing a graph embedding algorithm is that there must be a level of confidence that the algorithms are able to function gracefully when presented with an irregular hardware fabric based on some number of faulty, or otherwise unavailable qubits.

Another variable that is addressed is with respect to limitations based on the physical graph (hardware) having a finite range and limited precision with which these parameters can be set. One way of managing the embedding in instances when a parameter value is too large in magnitude to fit in the range is to scale the parameters down. A drawback is that such scaling may cause a loss of precision in the smaller parameters.

Techniques based on minor embedding are a primary tool for overcoming a limited qubit connectivity and faulty qubits in physical adiabatic quantum optimization implementations. For example, a minor embedding $G_{emb}$ of a problem graph G into a hardware graph U, is a subgraph of U such that G can be obtained from $G_{emb}$ by contracting edges.

Figure 5:
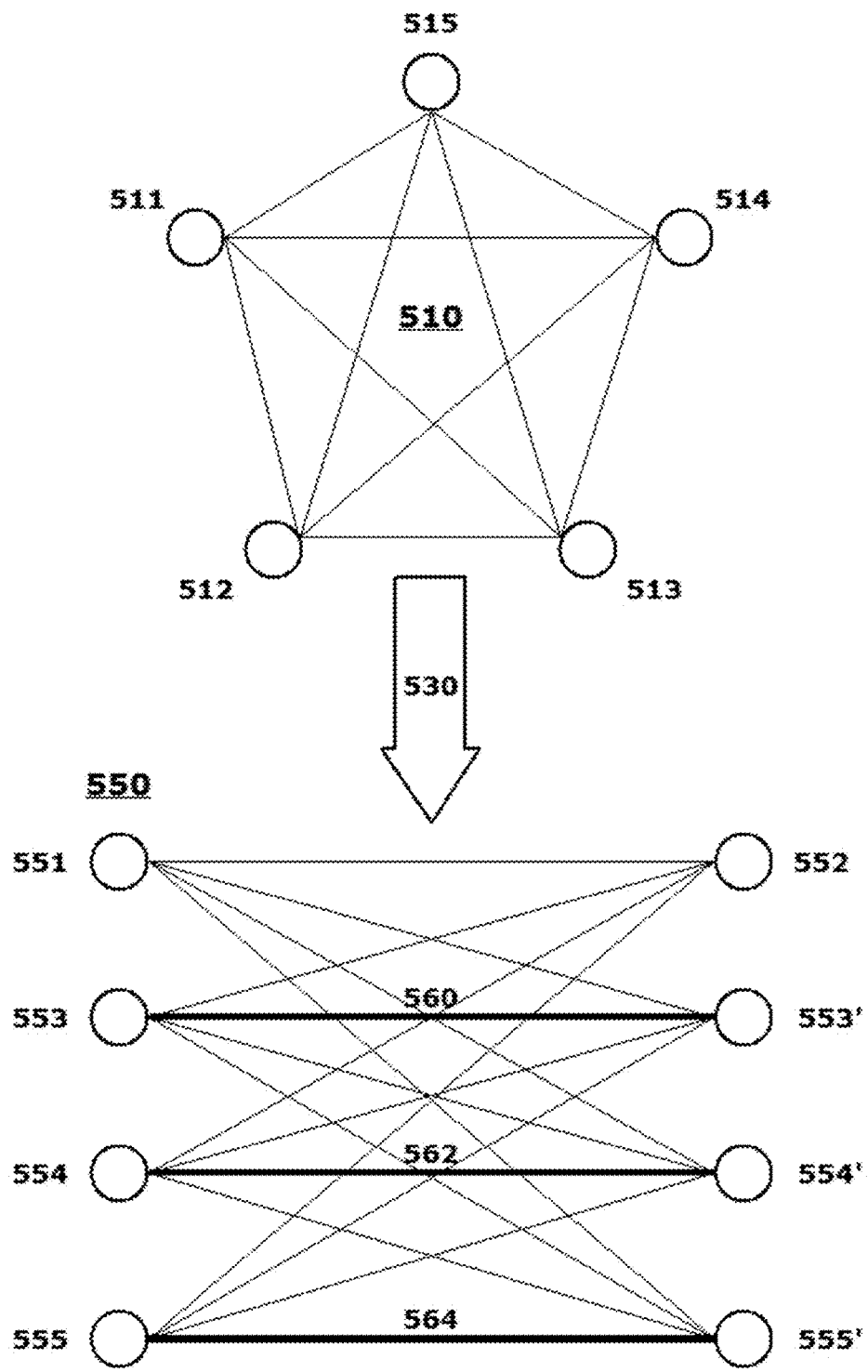
FIG. 5 illustrates a simple example where K5, a complete logical graph on five nodes is embedded into a unit cell.

FIG. 5 illustrates a simple example where K5, a complete logical graph 510 on five nodes 511-515 is embedded (process vector 530) into a unit cell 550. Logical nodes 511-515 are mapped to physical nodes 551,552,553,553', 554,554',555,555'. Note how logical nodes 513, 514 and 515 are each mapped to two physical nodes 553/553', 554/554' and 555/555', respectively, in the unit cell 550 in order to preserve the edges of the logical graph 510. The thicker lines 560, 562 and 564 are intended to indicate where strong ferromagnetic couplings are used to encourage the physical qubits to operate as a single logical qubit, creating a "chain."

As the size and connectivity of the problem graph increases, the number of physical qubits needed per logical node will grow. For example, a complete graph on 33 nodes is the largest complete graph for which an embedding has been found on the 512-qubit Chimera graph.

There may be many ways to minor embed a given problem graph into a hardware graph. Certain metrics may be defined to assess a quality of an embedding. Such metrics may be used to guide algorithm design, as well as to evaluate the performance of separate and distinct embedding methods.

A chain in the context of this disclosure defines a set of physical qubits in the embedded graph that correspond to the same logical node in the problem graph. The chain length is simply the number of qubits in this set. To understand a significance of a chain length as quantitative metric, there is a prescription for defining an Ising model on the embedded graph. See Choi, V., 'Minor-Embedding in Adiabatic Quantum Computation I. The Parameter Setting Problem," Quantum Information Processing 7, 193-209 (2008).

The prescription uses strong ferromagnetic couplings (see the depiction in FIG. 5 and the accompanying discussion) to enforce the embedding constraints. Specifically, the qubits in a chain should all take the same value. If it were possible to make these couplings infinitely strong, then the embedding constraints could be strictly enforced. Due to the finite parameter range, this is generally understood to be impossible. When the chain length becomes too large, solution quality deteriorates and fails to return solutions that correspond to correct solutions of the original problem.

A first metric used is max chain length, i.e., the maximum chain length taken over all nodes of the problem graph. If there are two embeddings of the same problem graph, the one with a smaller max chain length is better according to this metric.

A second metric for embedding quality is a number of nodes used, which is the total number of qubits in the embedded graph. If there are two embeddings of the same problem graph, the one with fewer nodes used is better according to this metric. Clearly, embedding algorithms that use fewer nodes are preferable in that those embedding algorithms may enable solving larger problems with the available number of qubits in the hardware. Additionally, the number of nodes used and the average chain length are generally equivalent measures—that is, the number of nodes used is directly proportional to the average chain length of an embedding.

The disclosed embodiments are directed to two general methods for uniquely undertaking graph embedding in view of the above-discussed considerations.

One graph embedding technique according to this disclosure may implement an iterative technique. The iterative technique may be used to achieve enhanced embedding over conventional embedding methods. The iterative technique may be considered to be based on the premise that an improved valid embedding of a logical or problem graph on a hardware (physical) graph may be achieved by iteratively placing nodes in better positions throughout the embedding process. "Better" positioning in this context may generally refer to placing each node slightly closer to all of the nodes with which the each node needs to be connected in an iterative process. An objective is to connect the each node to the other neighboring nodes using fewer nodes. At each step of the iterative process, as will be described in greater detail below, one node (or group of logical nodes) may be removed from a current (first, initial or other) position, and an attempt may be made to re-position the one node (or group of logical nodes) and to connect the one node (or a group of logical nodes) with neighbors of the one node (or group of nodes) at a next (second, subsequent or other) position. According to the disclosed schemes, the next position for the node (or group of logical nodes) may be selected because it is closer to the neighboring nodes of the one node (or the group of nodes) than the current position. The process may continue until certain conditions or constraints are achieved.

Figure 6:
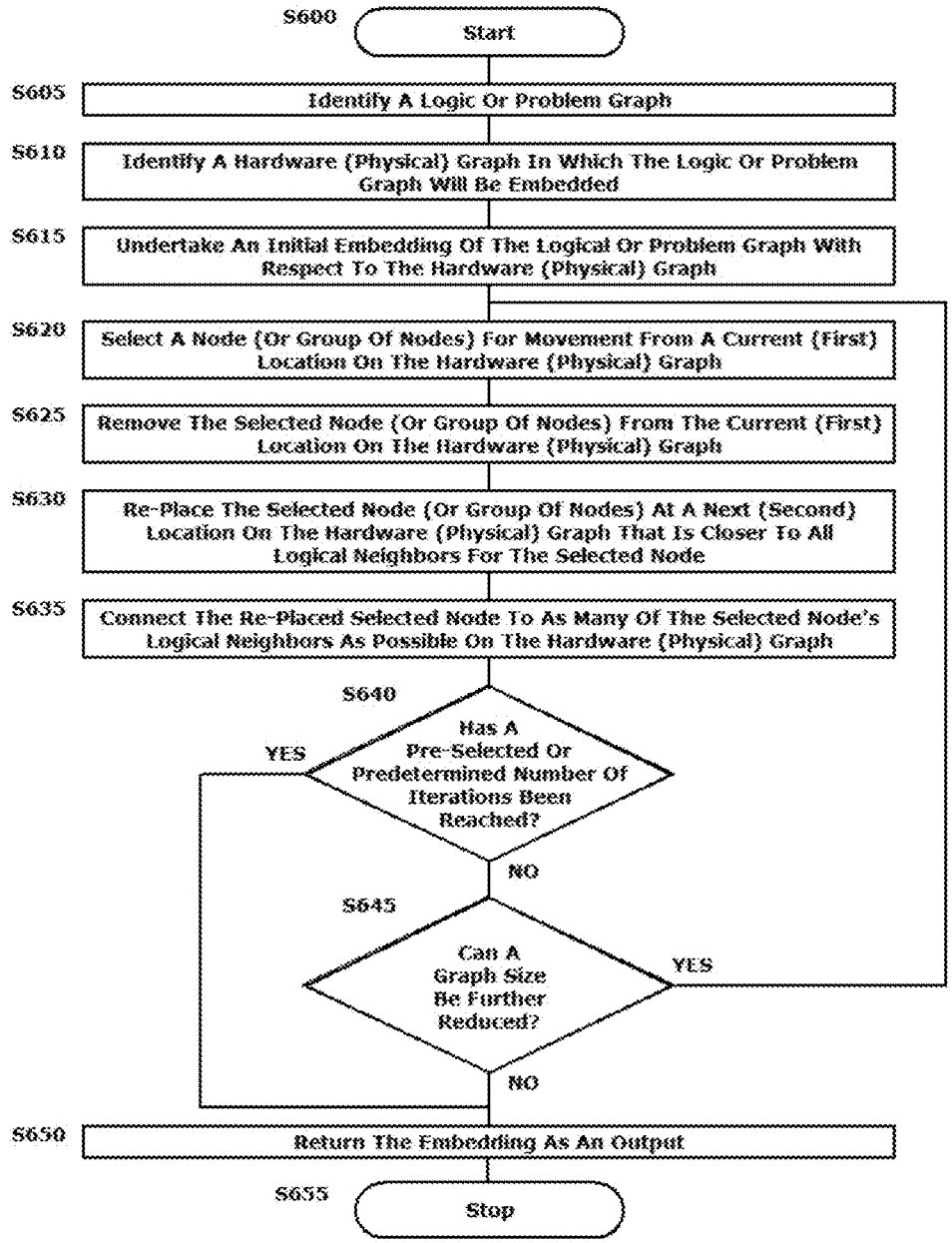
FIG. 6 illustrates a flowchart of an exemplary method for implementing an iterative technique for a graph embedding scheme according to this disclosure.

FIG. 6 illustrates a flowchart of an exemplary embodiment of such a graph embedding scheme employing an iterative technique. Operation of the method commences at Step S600 and proceeds to Step S605.

In Step S605, a logical or problem graph may be identified. Operation of the method proceeds to Step S610.

In Step S610, a hardware (physical) graph may be identified. Operation of the method proceeds to Step S615.

A concrete example of the above steps may include identifying a complete logical or problem graph with thirty (30) nodes, as L, and identifying a hardware (physical) graph, such as a Chimera graph on 512 qubits, as P.

In Step S615, an initial embedding of the logical or problem graph L with respect to the hardware (physical) graph P is undertaken. The initial embedding may include randomly scattering the nodes across the hardware (physical) graph P or by starting with a partial embedding that contains every logical node, which may be achieved by using another embedder to embed as much of the logical or problem graph L as possible into the hardware (physical) graph P. Operation of the method proceeds to Step S620.

In the initial embedding, all nodes from a logical or problem graph L may be placed into the hardware (physical) graph P. In the initial embedding, each node may be placed at a location that may be closest to all of the already-embedded logical neighbors currently present in the hardware (physical) graph P. The determining of the already-embedded logical neighbors may be made by implementing a breadth-first search. See the discussion below.

According to the disclosed iterative technique, not all of the edges in the logical or problem graph L are initially placed.

In Step S620, with the hardware (physical) graph P lacking connections in the logical graph, a node (or group of logical nodes) may be selected (identified) for movement from a current (first, initial or other) location. Operation of the method proceeds to Step S625.

In Step S625, for each selected node (or each node in the identified group), the each selected node may be removed from the embedding on the hardware (physical) graph P. Operation of the method proceeds to S630.

In Step S630, the each selected node (or each node in the identified group) may be placed as close as possible to all logical neighbors for the each logical node currently in the hardware (physical) graph P. Operation of the method proceeds to Step S635.

In Step S635, each node may then be connected to as many of that node's logical neighbors as possible. This may be accomplished by, for example, self-replicating along the minimum-distance path. The minimum distance paths may also be determined by a breadth-first search. Operation of the method proceeds to Step S640.

Step S640 is a determination step. In Step S640, a determination may be made as to whether a selected or preset number of iterations has been reached.

If, in Step S640, a determination is made that the selected or preset number of iterations has been reached, operation of the method proceeds to Step S650.

If, in Step S640, a determination is made that the selected or preset number of iterations has not been reached, operation of the method proceeds to Step S645.

Step S645 is a determination step. In Step S645, a determination is made as to whether a graph size can be further reduced.

If, in Step S645, a determination is made that the graph size can be further reduced, operation of the method reverts to Step S620.

Put another way, once all the nodes of the logical or problem graph L have been successfully embedded, repeating above steps may be undertaken to reduce the graph size.

If, in Step S645, a determination is made that the graph size cannot or will not be further reduced, operation of the method proceeds to Step S650.

In Step S650, the embedding may be returned as an output. Operation of the method proceeds to Step S655, where operation of the method ceases.

As is indicated above, the closest placement of a node n in, for example, either of Steps S615 or S630, may be determined by running a breadth-first search from each logical neighbor of the node n to every available (unassigned) node in the hardware (physical) graph P. At each available node, distances to all of node n's logical neighbors may be summed to determine the total distance. Node n may then be placed at an available node with lowest total distance.

As was indicated above, a single node may be selected in the course of the iterative technique, or in embodiments, multiple nodes (groups of logical nodes) are simultaneously selected. The iterations may be performed for all nodes in the graph in breadth-first search ordering, starting from a randomly selected node, for example.

The removal and replacement of groups of poorly placed nodes simultaneously increase efficiency and yield higher levels of improvement over conventional embedding/graphing schemes. One may recognize that, when individual nodes are singularly removed, they may frequently be re-placed near or at the same location in the hardware (physical) graph from which they were removed based on their neighbor nodes not having been moved. Thus, by removing groups of nodes simultaneously, this shortfall may be avoided and better embeddings achieved.

The above scheme may iterate over each of the nodes in the logical or problem graph L. For each iteration, an entire chain representing a logical node 1 may be removed from the hardware (physical) graph P. Next, a location in the hardware (physical) graph P closest to all of logical node 1's logical neighbors is determined and the logical node 1 is placed at the determined location. Finally, logical node 1 is connected to as many of its logical neighbors as possible. This connection may be through self-replication. The process continues until a user-defined (or otherwise specified, pre-selected or preset) maximum number of iterations is reached or the logic or problem graph L is successfully embedded. The successful completion of the embedding may be signaled when all necessary edges are present.

Experimentation involved running the algorithm for ten (10) iterations (where each iteration represented is a pass over all the logical nodes in the logical or problem graph L). Further experimentation in instances in which the application of the algorithm succeeded involved running the algorithm for an additional five (5) iterations to revise or "clean up" the graph to, for example, make the embedding smaller. Through this experimentation process, it was reasonably determined that acceptable results and better run times were achievable by reducing the number of cleanup iterations to one (1) or two (2).

In an embodiment, when two nodes are interconnected, a shortest path between them may be found, and the first node may be copied according to a specified percentage a along the interconnecting path, and then the second node may be copied for a remaining related percentage (100−α) of the path.

Embodiments may be modified and configured to use intelligent heuristics to enhance implementations of the disclosed methods.

In embodiments, instead of iterating over all of the nodes in the graph using, for example, the breadth-first search ordering from a randomly selected nodes, nodes with longer chain lengths or larger degrees could be prioritized and re-placed more often.

As is described above, logical nodes are placed in the into the hardware graph at the location "closest" to all of the nodes to which each logical node needs to be connected. This is facilitated by a determination being made as to the logical neighbors of the given logical node that are embedded in the hardware (physical) graph. The breadth-first-search may be run from (or with respect to) each of the neighbors (chains) to every free physical node in the hardware (physical) graph. Thus, distances are computed for each chain from a particular empty physical node. Finally, for each free physical node, the distances are summed from the free physical node to each chain to determine a total distance. In the disclosed embodiments, it is this sub-scheme that may be used to measure "closeness" in the hardware (physical) graph. The physical node with the smallest total distance may be the location at which the new logical node is positioned.

It should be recognized that, more generally, other distance metrics could be used. Such other distance metrics may include exploring paths that may block off logical nodes having greater distances than paths that avoid blocking other nodes.

During calculation of the "closest" location, if any of the paths overlap, the node that has just been placed may be copied into every part of an overlapping path. This may prevent nodes from blocking each other off as they are connected to the node that has just been placed.

To connect nodes, a shortest path between them may be found using a breadth-first search. A copy of the first node may be moved along a first a percentage half of the path and then copy the second node for the remaining percentage. In experiments, copying each node equally for 50% of the path length yielded objectively robust performance.

Certain conventional hardware implementations require that the logical graph be connected. The above-described iterative technique, however, treats connected graphs and disconnected graphs equally. There are no fundamental restrictions that would prevent the algorithm from application to the problem space of disconnected graphs.

Methods in accordance with the above-disclosed embodiment enable valid embedding if during each step of the process, each node is re-positioned in a more desirable location or a better location, i.e., a location that connects to more neighbors using fewer nodes.

Another graph embedding technique according to this disclosure may implement an edge placement technique. The edge placement method may begin with a list of all edges in the problem graph. The list of all edges may be ordered or random. At each step of the edge placement technique, placement of the next edge is performed. In instances where two nodes are already present, an attempt may be made to find the shortest path between the two nodes. If, on the other hand, one or both nodes are not already present, the nodes may be placed randomly, and shortest path connections may be established between the randomly-placed nodes. Once an edge is placed, a reduction method may be used to reduce the size of the graph.

Figure 7:
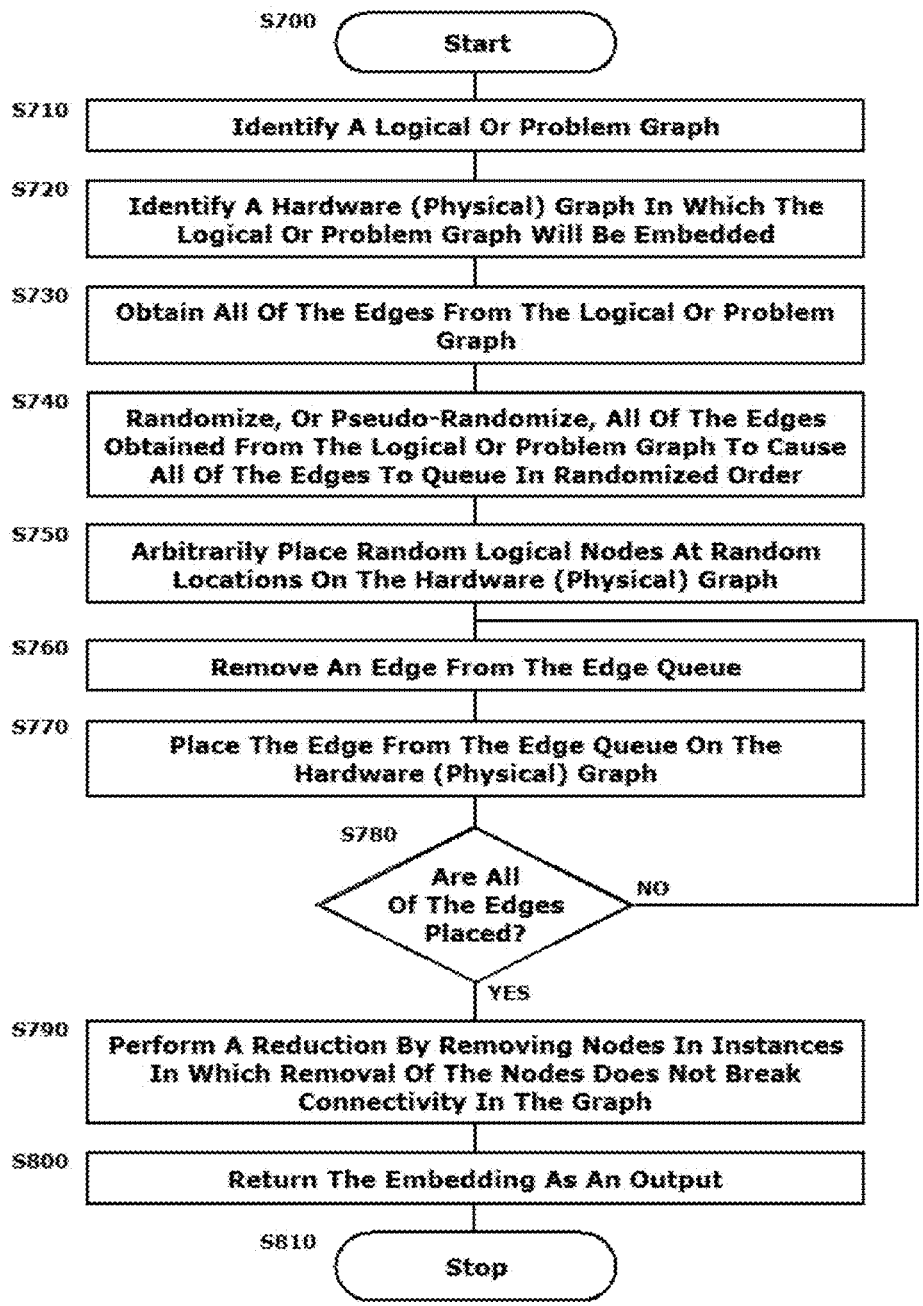
FIG. 7 illustrates a flowchart of an exemplary method for implementing an edge placement technique for a graph embedding scheme according to this disclosure.

FIG. 7 illustrates a flowchart of an exemplary embodiment of such a graph embedding technique employing an edge placement technique. Operation of the method commences at Step S700 and proceeds to Step S710.

In Step S710, a complete logical or problem graph may be identified. Operation of the method proceeds to Step S720.

In Step S720, a hardware (physical) graph may be identified. Operation of the method proceeds to Step S730.

In Step S730, all edges from the logical or problem graph may be obtained. Operation of the method proceeds to Step S740.

In Step S740, all of the edges may be randomized, or pseudo-randomized, in a manner that causes all edges to queue in randomized order. Operation of the method proceeds to Step S750.

In Step S750, random logical nodes may be arbitrarily placed on the hardware (physical) graph at random locations. Operation of the method proceeds to Step S760.

In Step S760, an edge may be removed from the edge queue. For example, where a connection is not already present in the hardware (physical) graph but a first node exists, this scheme may include placing a second node randomly onto the hardware (physical graph) and establishing a shortest path connection to the nearest physical qubit that represents node A. Where neither node is present on the physical graph, both a first and a second node may be randomly placed on the physical graph, and a shortest path connection established between them. Operation of the method proceeds to Step S770.

In Step S770, the edge removed from the edge queue may be placed on the hardware (physical) graph. Operation of the method proceeds to Step S780.

Step S780 is a determination step. In Step S780, a determination may be made as to whether all edges have been placed.

If, in Step S780, a determination is made that all of the edges have not been placed, operation of the method reverts to Step S760.

If, in Step S780, a determination is made that all of the edges have been placed, operation of the method proceeds to Step S790

In Step S790, a reduction may be performed by removing nodes in instances in which removal of the nodes does not break connectivity in the graph. Operation of the method proceeds to Step S800.

In Step S800, the embedding may be returned as an output. Operation of the method proceeds to Step S810, where operation of the method ceases.

Disclosed reductions (or reduction techniques) may be applied generally to previously discovered embeddings to create new embeddings. Starting with an existing embedding (by default, a complete graph embedding), reduction removes unnecessary nodes where possible.

The disclosed graph embedding techniques were experimentally found, or otherwise anticipated, to outperform known methods, processes, schemes techniques and/or algorithms for a broad spectrum of logical problem graphs that may arise in common applications. These techniques demonstrate enhanced performance with respect to certain metrics of embedding quality, such as the total number of qubits and maximum chain lengths. Applying the disclosed techniques has been found that for a particular quantum device, such as a 512 qubit D-Wave computer, methods disclosed herein provide solutions to larger problems than would otherwise be possible in certain cases.

The disclosed embodiments may include a non-transitory computer-readable medium storing instructions which, when executed by a processor, may cause the processor to execute all, or at least some, of the functions that may be appropriate to implementing the steps of the method outlined above.

Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The above-described exemplary systems and methods reference certain conventional quantum computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in implementing the graphical embedding techniques using many and widely-varied system components.

The exemplary depicted sequences of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments including in simultaneous or near simultaneous timing. No particular order to the disclosed steps of the method is necessarily implied by the depictions in FIGS. 6 and 7, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. For example, the principles of the disclosed embodiments may be applied to each individual graph embedding opportunity. This enables each user implementing the disclosed schemes to enjoy the benefits of the disclosed embodiments even if any one of the large number of possible end-user nodes do not need some portion of the described functionality. In other words, there may be multiple instances of the disclosed methods each processing the content in various possible ways. It does not necessarily need to be one method used by all end-user systems, devices and/or processors. Accordingly, the appended claims and their legal equivalents should only define the disclosed embodiments, rather than any specific examples given.

We claim:

1. A computer-implemented method, comprising:
   identifying a logical problem graph corresponding to a problem to be solved;
   identifying a hardware graph on which the logical problem graph can be embedded, the hardware graph corresponding a topology of qubits of a quantum computing device;
   performing, with a processor, an initial embedding of the logical problem graph on the hardware graph;
   iterating, with the processor, locations of nodes in the logical problem graph on the hardware graph to revise the initial embedding;
   returning the embedding as an output to be applied to the qubits of the quantum computer for solving of the problem with the quantum computing device; and
   solving the problem with the quantum computing device by applying the output to the qubits of the quantum computer.

2. The computer-implemented method of claim 1, the iterating the locations of the nodes comprising:
   selecting a node for movement from a first location to a second location on the hardware graph;
   removing the node from the first location on the hardware graph; and
   re-placing the node in the second location on the hardware graph.

3. The computer-implemented method of claim 2, the selecting the node for movement comprising selecting individual nodes for movement.

4. The computer-implemented method of claim 2, the selecting the node for movement comprising selecting groups of nodes for movement.

5. The computer-implemented method of claim 2, the second location being comparatively closer to the all logical neighbors of the selected node than the first location.

6. The computer-implemented method of claim 5, further comprising determining a comparatively closer location by applying a breadth-first search.

7. The computer-implemented method of claim 2, the selecting the node for movement being performed in a specified order for a plurality of nodes.

8. The computer-implemented method of claim 7, the specified order being according to a breadth-first search.

9. The computer-implemented method of claim 1, the initial embedding of the logical problem graph on the hardware graph comprising initially placing all nodes of the logical problem graph on the hardware graph.

10. The computer-implemented method of claim 1, the initial embedding of the logical problem graph on the hardware graph comprising initially placing at least some of the nodes as close as possible to all of the already-embedded logical neighbor nodes to the at least some of the nodes being initially placed.

11. The computer-implemented method of claim 1, further comprising:
    establishing a number of iterations to complete the embedding; and
    repeating the iterating with respect to all of the nodes of the logical problem graph until the established number of iterations is achieved.

12. The computer-implemented method of claim 11, the number of iterations being user selected.

13. The computer-implemented method of claim 11, further comprising:
    evaluating whether a size of the logical problem graph embedded on the hardware graph can be reduced; and
    further iterating the locations of the nodes in the logical problem graph on the hardware graph to reduce the size.

14. The computer-implemented method of claim 1, further comprising connecting the nodes after the iterating.

15. The computer-implemented method of claim 14, further comprising:
    when two nodes are interconnected, determining a shortest path between a first node and a second node;

copying the first node according to a specified percentage a along an interconnecting path; and copying the second node along the remainder of the interconnecting path.

16. A computer-implemented method, comprising:

identifying a logical problem graph corresponding to a problem to be solved;

identifying a hardware graph on which the logical problem graph can be embedded, the hardware graph corresponding to a topology of qubits of a quantum computing device;

obtaining all edges from the logical problem graph;

randomizing, with a processor, the edges to cause all edges to queue in a randomized order;

arbitrarily placing logical nodes from the logical problem graph on the hardware graph;

removing an edge from the edge queue and placing the edge on the hardware graph;

returning the embedding as an output to be applied to the qubits of the quantum computer for solving of the problem with the quantum computing device; and solving the problem with the quantum computing device by applying the output to the qubits of the quantum computer.

17. The computer implemented method of claim 16, the placing the edge on the hardware graph comprising:

determining that only a first node exists on the hardware graph;

randomly placing a second node on the hardware graph; and establishing a shortest path connection between the first node and the second node.

18. The computer implemented method of claim 16, the placing the edge on the hardware graph comprising:

determining that nether a first node or a second node exists on the hardware graph;

randomly placing the first node and the second node on the hardware graph; and establishing a shortest path connection between the first node and the second node.

19. The computer-implemented method of claim 16, further comprising performing a reduction on an embedded graph.

20. The computer-implemented method of claim 19, the reduction comprising removing nodes in instances in which it is determined that the removing does not break connectivity in the embedded graph.

* * * * *